(12) United States Patent
Wagner et al.

(10) Patent No.: US 12,054,129 B2
(45) Date of Patent: Aug. 6, 2024

(54) METHOD FOR OPERATING A VEHICLE BRAKE SYSTEM, CONTROL UNIT, AND VEHICLE

(71) Applicant: Robert Bosch GmbH, Stuttgart (DE)

(72) Inventors: Jochen Wagner, Moeglingen (DE); Florian Haag, Ellhofen (DE); Martin Marquart, Reichenbach (DE)

(73) Assignee: ROBERT BOSCH GMBH, Stuttgart (DE)

( * ) Notice: Subject to any disclaimer, the term of this patent is extended or adjusted under 35 U.S.C. 154(b) by 757 days.

(21) Appl. No.: 17/274,053

(22) PCT Filed: Jan. 16, 2020

(86) PCT No.: PCT/EP2020/051043
§ 371 (c)(1),
(2) Date: Mar. 5, 2021

(87) PCT Pub. No.: WO2020/152027
PCT Pub. Date: Jul. 30, 2020

(65) Prior Publication Data
US 2021/0269005 A1 Sep. 2, 2021

(30) Foreign Application Priority Data
Jan. 24, 2019 (DE) .......................... 102019200826.7

(51) Int. Cl.
*B60T 8/44* (2006.01)
*B60T 8/40* (2006.01)
(Continued)

(52) U.S. Cl.
CPC .......... *B60T 13/662* (2013.01); *B60T 8/4077* (2013.01); *B60T 8/441* (2013.01); *B60T 8/94* (2013.01);
(Continued)

(58) Field of Classification Search
CPC .... B60T 13/667; B60T 13/745; B60T 8/4077; B60T 8/441; B60T 8/94; B60T 2201/03
See application file for complete search history.

(56) References Cited

U.S. PATENT DOCUMENTS 6,375,282 B1 4/2002 Inoue et al.
6,905,181 B2 * 6/2005 Iwagawa ............. B60T 8/17616
701/76
(Continued)

FOREIGN PATENT DOCUMENTS

CN 101580061 A 11/2009
CN 201800696 U 4/2011
(Continued)

OTHER PUBLICATIONS

International Search Report for PCT/EP2020/051043, Issued Apr. 20, 2020.

*Primary Examiner* — Thomas W Irvin
(74) *Attorney, Agent, or Firm* — NORTON ROSE FULBRIGHT US LLP; Gerard A. Messina

(57) ABSTRACT

A method for operating a vehicle brake system including a brake booster and an electronic traction control device, which is used as a fallback level in a malfunction of the brake booster. The position of an accelerator pedal is ascertained when a malfunction of the brake booster is detected, and under the precondition that the accelerator pedal is released, a predefined initial pressure is built up in a pressure chamber of a master brake cylinder of the vehicle brake system with the aid of the traction control device so that a deceleration of the vehicle is induced. A control unit which is designed to carry out the method, and a vehicle having a vehicle brake system and a control unit, are also described.

8 Claims, 2 Drawing Sheets

(51) Int. Cl.
  *B60T 8/94* (2006.01)
  *B60T 13/66* (2006.01)
  *B60T 13/74* (2006.01)

(52) U.S. Cl.
  CPC ......... *B60T 13/745* (2013.01); *B60T 2201/03* (2013.01)

(56) References Cited

U.S. PATENT DOCUMENTS

| | | | | |
|---|---|---|---|---|
| 7,957,874 | B2* | 6/2011 | Labuhn | B60T 7/12 |
| | | | | 701/70 |
| 10,377,361 | B2* | 8/2019 | Blattert | B60T 7/042 |
| 10,773,700 | B2* | 9/2020 | Haag | B60T 13/166 |
| 11,142,175 | B2* | 10/2021 | Chow | B60T 8/171 |
| 11,685,357 | B2* | 6/2023 | Marquart | B60T 8/885 |
| | | | | 73/121 |
| 2004/0113489 | A1* | 6/2004 | Iwagawa | B60T 7/107 |
| | | | | 303/155 |
| 2006/0163941 | A1* | 7/2006 | Von Hayn | B60T 7/042 |
| | | | | 303/155 |
| 2008/0234907 | A1* | 9/2008 | Labuhn | B60T 7/042 |
| | | | | 701/70 |
| 2011/0029215 | A1* | 2/2011 | Willmann | B60T 8/4072 |
| | | | | 701/78 |
| 2019/0315326 | A1* | 10/2019 | Haag | B60T 13/662 |
| 2020/0216044 | A1* | 7/2020 | Chow | B60T 8/171 |

FOREIGN PATENT DOCUMENTS

| | | |
|---|---|---|
| CN | 205737497 U | 11/2016 |
| CN | 106553631 A | 4/2017 |
| CN | 108437807 A | 8/2018 |
| DE | 102015224665 A1 | 6/2017 |
| DE | 102016225694 A1 | 6/2018 |
| JP | 2001225739 A | 8/2001 |
| JP | 2014019266 A | 2/2014 |

* cited by examiner

METHOD FOR OPERATING A VEHICLE BRAKE SYSTEM, CONTROL UNIT, AND VEHICLE

FIELD

The present invention relates to a method for operating a vehicle brake system. A vehicle brake system operable according to the present method includes a brake booster and an electronic traction control device, which can be used as a backup system in the event of a malfunction of the brake booster.

In addition, the present invention relates to a control unit which is set up to carry out the method according to the present invention. A vehicle which has a vehicle brake system as well as a control unit, which is designed to carry out the method according to the present invention, is also provided.

BACKGROUND INFORMATION

A vehicle brake system of the aforementioned type is described in German Patent Application No. DE 10 2016 225 694 A1, for example. It includes both a brake booster and a traction control device. The traction control device allows for a wheel-individual distribution of a brake pressure to multiple wheel brakes. In a malfunction of the brake booster, the traction control device also assumes the brake boosting. For this purpose, a control unit of the traction control device acquires the pressure in a pressure chamber of a master brake cylinder. The pressure in the pressure chamber of the master brake cylinder rises when the driver operates the brake pedal.

In a malfunction, that is to say, without brake boosting by the brake booster, the force initially to be applied by the driver when the vehicle brake system is operated is considerably greater than in a normal case. As a rule, a brake force assist by the traction control device can take place only once a certain prepressure has been built up in the pressure chamber of the master brake cylinder.

In order to reduce the initial force required to activate the traction control device in the event of a malfunction and to provide the driver with better pedal feedback, German Patent Application No. DE 10 2016 225 694 A1 provides for the use of a first and a second input signal during the actuation of a pressure generator of the traction control device. The two input signals, the first of the first indicates a braking intention of the driver and the second represents the brake pressure generated by the driver in the pressure chamber of the master brake cylinder, are further processed into evaluation signals, which are subsequently added to form a cumulative value that corresponds to a setpoint brake pressure value. This in turn is converted into a corresponding actuation signal for a pressure generator of the traction control device.

SUMMARY

In accordance with an example embodiment of the present invention, a method for operating a vehicle brake system is provided, which allows for a pressure buildup in a pressure chamber of a master brake cylinder by a traction control device in the event of a malfunction of a brake booster even if the driver does not operate the brake pedal. In the event that the driver does operate the brake pedal, better pedal feedback is meant to be achieved by reducing the required initial force.

Advantageous further refinements and example embodiments of the present invention are described herein. In addition, a control unit and a vehicle are also described.

In accordance with an example embodiment of the present invention, a method is provided for operating a vehicle brake system, which includes a brake booster and an electronic traction control device. In the method, the traction control device is used as a fallback level during a malfunction of the brake booster. According to the present invention, the position of an accelerator pedal is ascertained when a malfunction of the brake booster is detected, and under the precondition that the accelerator pedal is released, a predefined initial pressure is built up in a pressure chamber of a master brake cylinder of the vehicle brake system with the aid of the traction control device. This induces a deceleration of the vehicle even if the driver is not operating the brake pedal. If the driver subsequently does operate the brake pedal, then the force expenditure is low because the required initial force was already generated with the aid of the traction control device. In the final analysis, a better pedal feedback is achieved for the driver.

Since a pressure buildup in the pressure chamber of the master brake cylinder according to the present invention takes place only with a released accelerator pedal, that is to say, an accelerator pedal that is not operated, the present method is able to be executed without the involvement of a drive train of the vehicle. In particular, no acceleration has to be suppressed by the drive train in order to achieve the desired deceleration. The implementation takes place solely in the brake system of the vehicle.

The initial pressure built up in the pressure chamber of the master brake cylinder with the aid of the traction control device may amount to 8 bar, for example.

The pressure buildup to the initial pressure in the pressure chamber of the master brake cylinder is preferably controlled in its timing with the aid of the traction control device. The time control allows for a pressure buildup to the initial pressure independently of a prepressure in the pressure chamber of the master brake cylinder, and thus independently of the position of the brake pedal of the vehicle brake system. This means that there is no need first to build up a certain prepressure in the pressure chamber of the master brake cylinder.

When the present method is carried out, that is to say, with a released accelerator pedal, the position of the brake pedal of the vehicle brake system is preferably ascertained. If an operation of the brake pedal is detected, a prepressure generated in the pressure chamber of the master brake cylinder by the operation of the brake pedal is able to be taken into account in the pressure buildup in the pressure chamber of the master brake cylinder. Preferably, the pressure buildup then takes place proportionally to the generated prepressure, i.e., boosted by a factor x, such as by a factor of 3.

In addition, in a detected operation of the brake pedal, a pressure, which corresponds to a prepressure boosted by a factor x plus the initial pressure, is preferably built up in the pressure chamber of the master brake cylinder with the aid of the traction control device. The minimum pressure in the pressure chamber of the master brake cylinder thus corresponds to the initial pressure generated with the aid of the traction control device.

To ascertain the brake pedal position, the pressure in the pressure chamber of the master brake cylinder is preferably measured. A corresponding sensor system is normally already in place so that it is able to be utilized. A certain prepressure does have to be generated to begin with so that the sensor system is able to detect it. Since the pressure buildup to an initial pressure takes place independently of an operation of the brake pedal according to the present invention, it is unimportant whether the operation of the brake pedal is detected right away or only starting with the buildup of a certain prepressure.

In a further refinement of the present invention, it is provided to establish a further fallback level, e.g., using binary information according to the related art described above. Via the additional fallback level, a further improvement of the braking characteristic of the vehicle brake system is able to be achieved.

In an advantageous manner, after a pressure buildup to an initial pressure in the pressure chamber of the master brake cylinder, the position of the accelerator pedal is ascertained again. If an operation of the accelerator pedal is detected after a pressure buildup to an initial pressure, then pressure is reduced in the pressure chamber of the master brake cylinder. The pressure reduction is meant to allow for a renewed acceleration of the vehicle after a previously induced deceleration of the vehicle. The timing of the pressure reduction is preferably controlled by the traction control device.

In accordance with an example embodiment of the present invention, a malfunction of the brake booster is preferably detected with the aid of a control unit of the traction control device, which is connected for this purpose in a data-transmitting manner to the brake booster, for instance via a CAN bus. The control unit may then be informed of the malfunction by a corresponding message of the brake booster. If the brake booster is malfunctioning to such a degree that a corresponding message can no longer be sent, then the malfunction can be recognized by the communications failure. If the brake booster is a vacuum brake booster, then a malfunction is able to be detected by evaluating a vacuum pressure sensor.

Since a control unit is preferably used when carrying out the method according to the present invention, a control unit is furthermore provided, which is set up to carry out the method according to the present invention. For instance, the device may include installing a computer program, which includes a program code that carries out the method when the computer program is running in the control unit.

Moreover, in accordance with an example embodiment of the present invention, a vehicle having a vehicle brake system and a control unit is provided, the control unit being set up to carry out the method (s) according to the present invention. The advantages described above in connection with the present method are also able to be achieved by the vehicle. More specifically, the brake comfort for the driver of the vehicle in the event of a malfunction of the brake booster is able to be increased.

Below, the present invention is described in greater detail with the aid of the figures.

DETAILED DESCRIPTION OF EXAMPLE EMBODIMENTS

Figure 1:
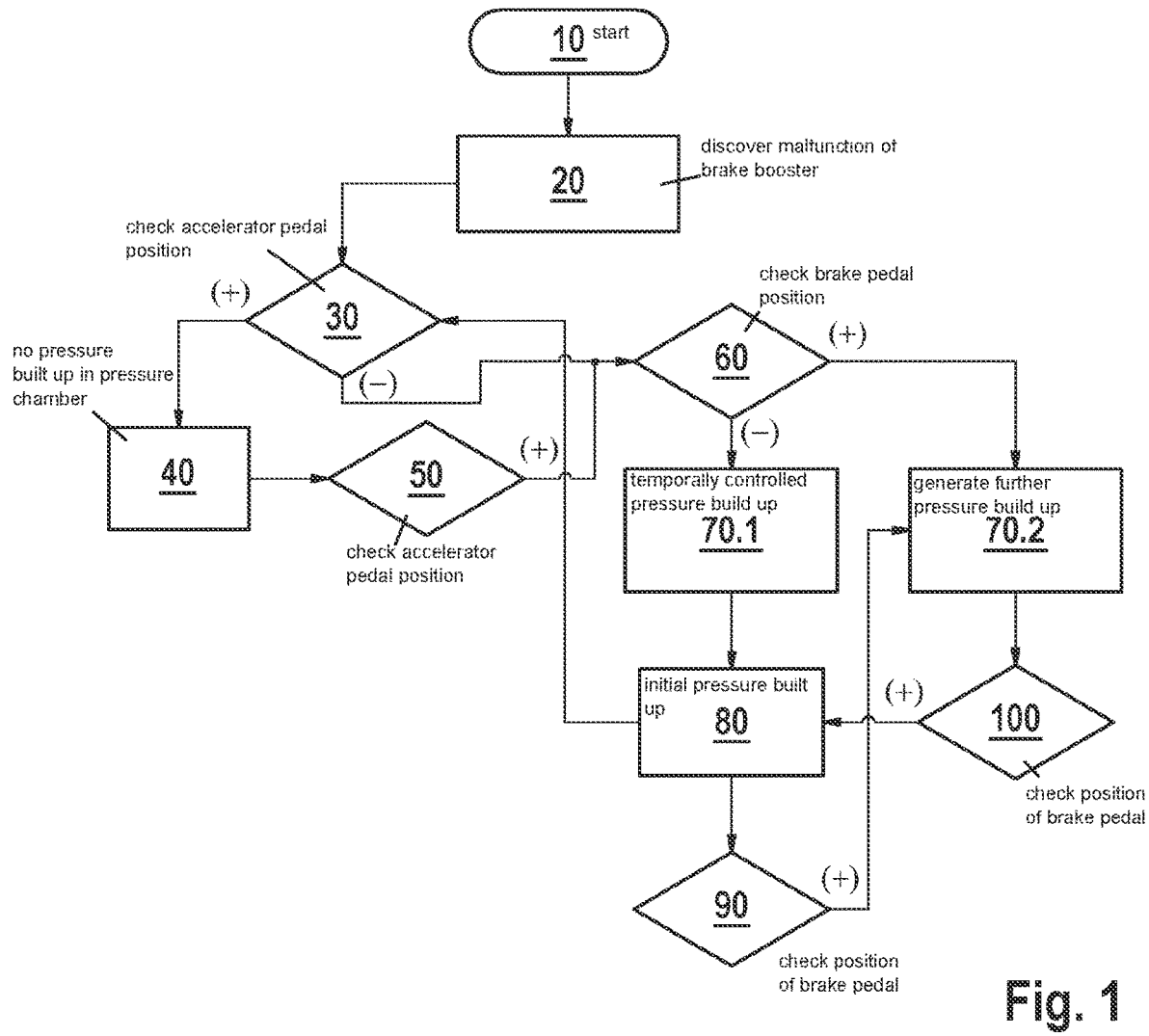
FIG. 1 shows a flow diagram for the graphical representation of a typical sequence of a method according to an example embodiment of the present invention.

To begin with, a typical method sequence of a method according to an example embodiment of the present invention is described based on the flow diagram shown in FIG. 1.

Starting from a state 10 in which the vehicle brake system is still working properly, a malfunction of a brake booster of the vehicle brake system is discovered in step 20. With the occurrence of the malfunction, the position of the accelerator pedal is ascertained in a next step 30 in order to check whether the driver is operating the accelerator pedal or whether the accelerator pedal is released. For with an operation of the accelerator pedal, the vehicle is accelerated so that a deceleration of the vehicle can be undertaken only when involving a drive train. However, this is meant to be prevented in this instance, so that no pressure is built up in a pressure chamber of a master brake cylinder with the aid of a traction control device when the accelerator pedal is operated in step 40. If it is determined in a renewed check 50 that the accelerator pedal is now released, then the position of the brake pedal is first ascertained in step 60. If it is assumed that the brake pedal is released due to an absent prepressure in the pressure chamber of the master brake cylinder, then a temporally controlled pressure buildup in the pressure chamber of the master brake cylinder to a predefined initial pressure such as to 8 bar takes place in step 70.1. If the initial pressure has been built up or state 80 been reached, then the position of the brake pedal is ascertained anew in step 90 in order to check whether the driver has now operated the brake pedal. If this is the case, then a further pressure buildup is generated in the pressure chamber of the master brake cylinder with the aid of the traction control device in step 70.2, which—added to the initial pressure—corresponds to the prepressure induced by the driver by operating the brake pedal multiplied by a factor x. If another check of the brake pedal position carried out in step 100 indicates that the brake pedal is released, then the pressure in the pressure chamber is lowered to the initial pressure so that state 80 is reached again. Next, step 30 is repeated in order to determine whether the accelerator pedal is operated again. If this is the case, then no pressure will be built up in the pressure chamber in step 40 but the pressure is actively reduced in order to allow for an acceleration of the vehicle.

With the aid of the method according to an example embodiment of the present invention, a positive change in the braking characteristic of a vehicle is achievable, which manifests itself in greater braking comfort for the driver. The acceleration characteristic of the vehicle remains unchanged in the process.

Figure 2:
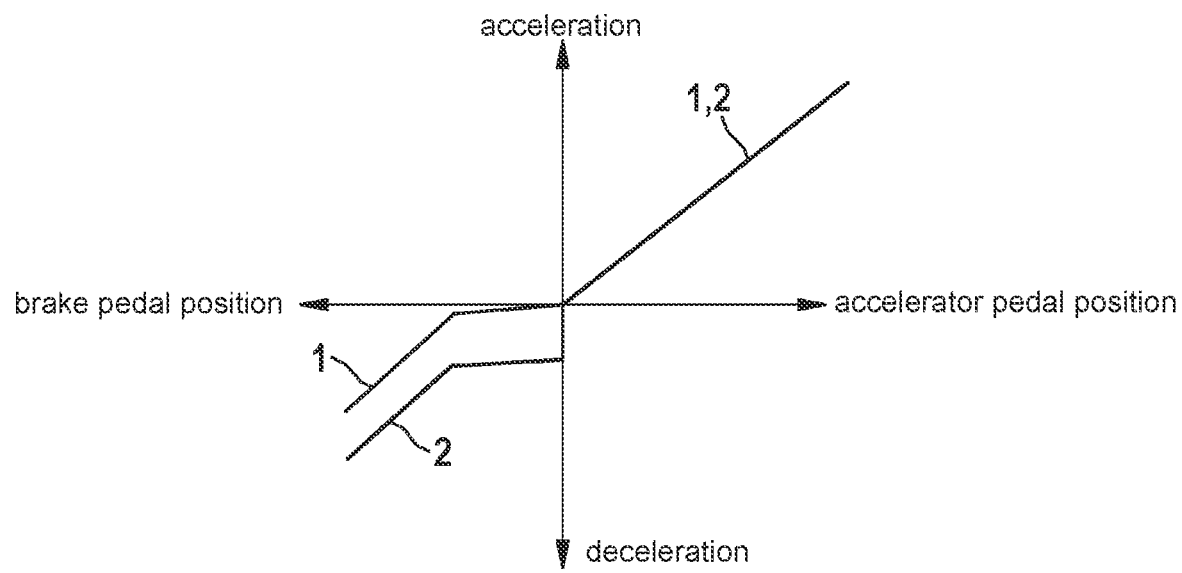
FIG. 2 shows a schematic representation of the deceleration and acceleration characteristic via the accelerator and/or brake pedal position according to the related art and according to a first example embodiment of the present invention.

As illustrated in FIG. 2 by way of example, when the accelerator pedal is operated, the vehicle is accelerated in proportion to the position of the accelerator pedal (see graph 1, 2 in the right half of FIG. 2). If a malfunction of the brake booster is detected, it is first checked whether the accelerator pedal is operated or whether the accelerator pedal is released. If the latter is the case, then brake boosting according to the provided method of the present invention is able to be carried out. To this end, a pressure buildup to an initial force is first induced with the aid of the traction control device, i.e., regardless of whether or not the brake pedal is operated at the same time. The initial pressure is selected to be so high that a clear deceleration of the vehicle is induced (see perpendicular characteristic of graph 2 in the center of FIG. 2). If the driver operates the brake pedal, then this slowly leads to a further pressure buildup in the pressure cylinder of the master brake cylinder which, however, is low in comparison with the already generated initial pressure and thus has barely any effect on the deceleration of the vehicle (see slightly dropping slope of graph 2 in the left half of FIG. 2). Only once a certain prepressure has been reached, it is detected and boosted by a certain factor x with the aid of the traction control device (see steeply dropping slope of graph 2 in the left half of FIG. 2).

The related art is shown by graph 1. Here, the deceleration of the vehicle depends on the operation of the brake pedal by the driver. This means that the driver has to operate the brake pedal and that a certain prepressure must first be reached in the pressure chamber of the master brake cylinder before pressure boosting can be achieved with the aid of the traction control device.

Figure 3:
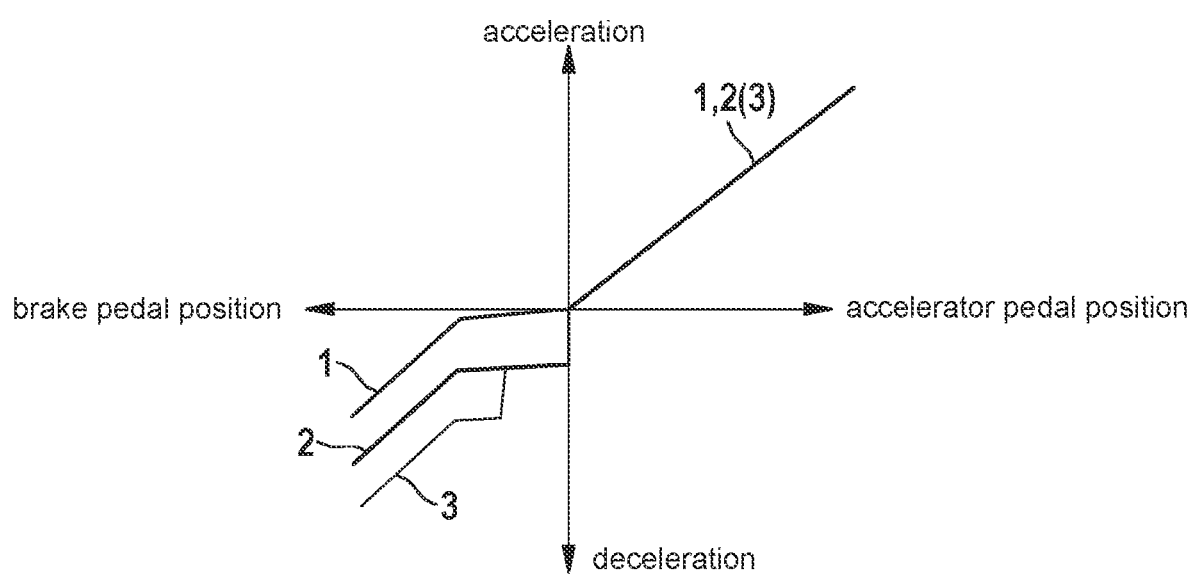
FIG. 3 shows a schematic representation of the deceleration and acceleration characteristic via the accelerator and/or brake pedal position according to the related art as well as according to a first and a second example embodiment of the present invention.

A further refinement of the present invention may be gathered from FIG. 3. In FIG. 3, graph 3 symbolizes a further fallback level provided using binary information. This may be a distance-dependent information, for example, from which the brake pedal position can be derived. The required measurement is able to be carried out with the aid of a travel sensor of the brake booster. However, this assumes that the malfunction has not resulted in a complete failure of the brake booster.

What is claimed is:

1. A method for operating a vehicle brake system, the vehicle brake system including a brake booster and an electronic traction control device, which is used as a fallback level in a malfunction of the brake booster, the method comprising:
    detecting a malfunction of the brake booster;
    ascertaining a position of an accelerator pedal; and
    under a precondition that the accelerator pedal is released, building up a predefined initial pressure in a pressure chamber of a wheel brake cylinder of the vehicle brake system using the traction control device so that a deceleration of the vehicle is induced, wherein the pressure buildup to the initial pressure is controlled in its timing using the traction control device.

2. The method as recited in claim 1, wherein once a certain prepressure has been reached in a pressure chamber of a master brake cylinder after a detected operation of a brake pedal, a pressure, which corresponds to a prepressure boosted by a factor plus the initial pressure, is built up in the pressure chamber of the wheel brake cylinder using the traction control device.

3. The method as recited in claim 1, wherein a further fallback level is established, using binary information.

4. The method as recited in claim 1, wherein after the pressure buildup to the initial pressure in the pressure chamber of the wheel brake cylinder, the position of the accelerator pedal is ascertained again and if the accelerator pedal is operated, the pressure is reduced, the pressure reduction being controlled in its timing using the traction control device.

5. A method for operating a vehicle brake system, the vehicle brake system including a brake booster and an electronic traction control device, which is used as a fallback level in a malfunction of the brake booster, the method comprising:
    detecting a malfunction of the brake booster;
    ascertaining a position of an accelerator pedal; and
    under a precondition that the accelerator pedal is released, building up a predefined initial pressure in a pressure chamber of a wheel brake cylinder of the vehicle brake system using the traction control device so that a deceleration of the vehicle is induced,
    wherein to ascertain a position of a brake pedal, a pressure in a pressure chamber of a master brake cylinder is measured.

6. A method for operating a vehicle brake system, the vehicle brake system including a brake booster and an electronic traction control device, which is used as a fallback level in a malfunction of the brake booster, the method comprising:
    detecting a malfunction of the brake booster;
    ascertaining a position of an accelerator pedal; and
    under a precondition that the accelerator pedal is released, building up a predefined initial pressure in a pressure chamber of a wheel brake cylinder of the vehicle brake system using the traction control device so that a deceleration of the vehicle is induced, wherein the malfunction of the brake booster is detected using a control unit of the traction control device, which is connected in a data-transmitting manner to the brake booster via a CAN bus.

7. A control unit configured to operate a vehicle brake system, the vehicle brake system including a brake booster and an electronic traction control device, which is used as a fallback level in a malfunction of the brake booster, the control unit configured to:
    detect a malfunction of the brake booster;
    ascertain a position of an accelerator pedal; and
    under a precondition that the accelerator pedal is released, build up a predefined initial pressure in a pressure chamber of a wheel brake cylinder of the vehicle brake system using the traction control device so that a deceleration of the vehicle is induced, wherein the pressure buildup to the initial pressure is controlled in its timing using the traction control device.

8. A vehicle, comprising:
    a vehicle brake system including a brake booster and an electronic traction control device; and
    a control unit configured to operate the vehicle brake system, the control unit configured to:
    detect a malfunction of the brake booster,
    ascertain a position of an accelerator pedal, and
    under a precondition that the accelerator pedal is released, build up a predefined initial pressure in a pressure chamber of a wheel brake cylinder of the vehicle brake system using the traction control device so that a deceleration of the vehicle is induced, wherein the pressure buildup to the initial pressure is controlled in its timing using the traction control device.

\* \* \* \* \*